United States Patent
Cadiou

[15] 3,685,854
[45] Aug. 22, 1972

[54] VEHICLES WITH SHORT WHEEL BASE AND OF SMALL BULK, ESPECIALLY PASSENGER VEHICLES

[72] Inventor: Jean-Georges Cadiou, Paris, France
[73] Assignee: Societe Anonyme Automobiles Citroen, Paris, France
[22] Filed: April 14, 1970
[21] Appl. No.: 28,346

[30] Foreign Application Priority Data

April 16, 1969 France.......................6911862

[52] U.S. Cl. ..............................280/106.5 R, 296/64
[51] Int. Cl. ..............................................B62d 21/00
[58] Field of Search...................................280/106.5

[56] References Cited

UNITED STATES PATENTS 2,715,041   8/1955   Fierbaugh.......280/106.5 R X
2,133,633   10/1938   Rabe..................280/106.5 R
2,499,495   3/1950   Gregory.............280/106.5 R

*Primary Examiner*—Phillip Goodman
*Attorney*—Fleit, Gipple & Jacobson

[57] ABSTRACT

The vehicle has a chassis including at least in its front part two longitudinal members of hollow cross section dividing the width of the vehicle into three parallel equal parts. The front wheels at least are independent and are attached to longitudinal torsion bars downwardly inclined from the rear to the front. The rear upper portions of the torsion bars are housed in the longitudinal members. The major portion of the floor is at the lower level of the longitudinal members. Four seats are arranged at the apices of a diamond, the foremost seat for the driver being the highest.

14 Claims, 6 Drawing Figures

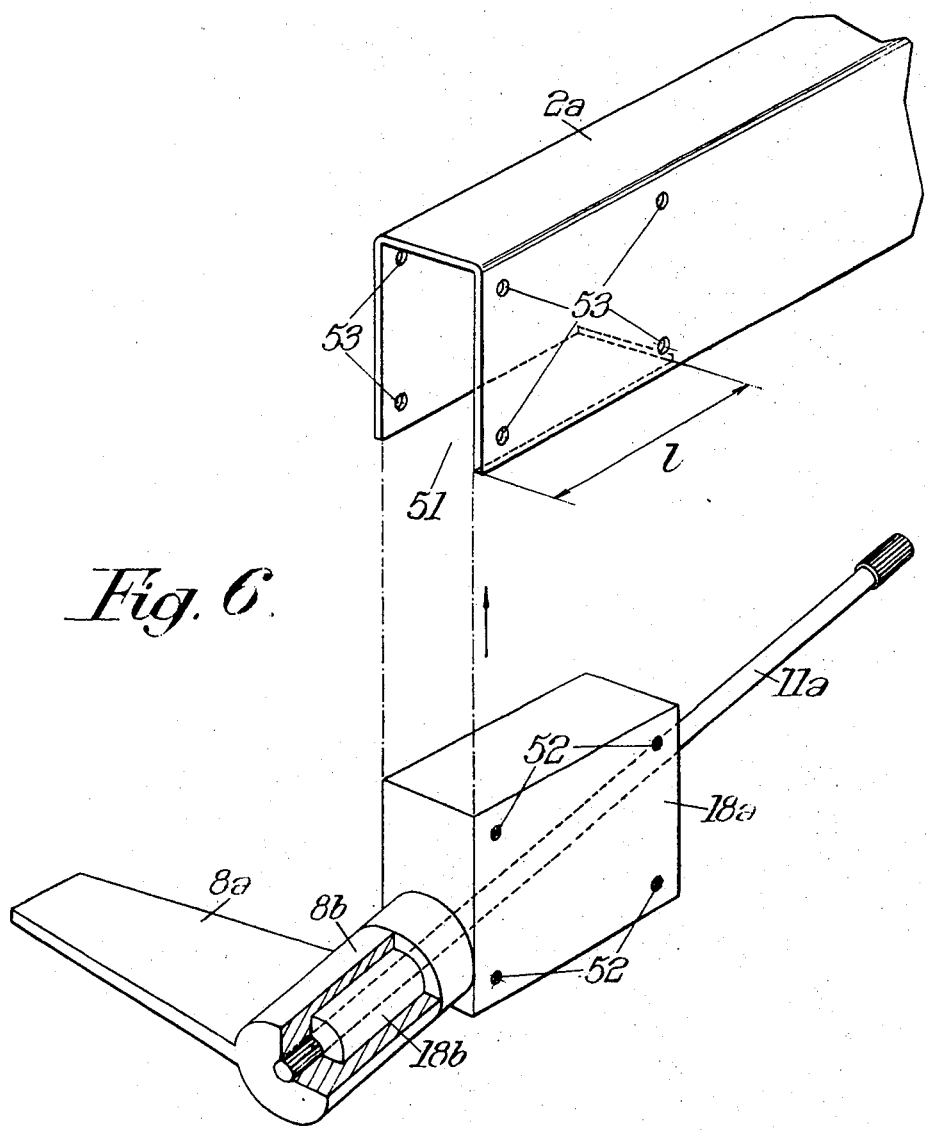

VEHICLES WITH SHORT WHEEL BASE AND OF SMALL BULK, ESPECIALLY PASSENGER VEHICLES

The present invention relates to improvements in vehicles with short wheel base and small bulk especially passenger vehicles. More particularly it relates to such vehicles of the type in which at least the front wheels are independent by suspended, which comprise on one hand, chassis provided, at least in its front part with two longitudinal members, of hollow cross section, substantially parallel to the longitudinal axis of the vehicle and dividing the width of the latter into three substantially equal parts and, on the other hand, a floor of which the major part is situated at the lower level of the longitudinal members.

The invention relates more particularly, because it is in this case that its application seems to have the most advantage, but not exclusively, among such vehicles, to passenger vehicles.

Such vehicles have already been proposed to facilitate the movement of traffic and parking in cities where the density of the automobile traffic poses numerous problems. Generally, the design of these vehicles, especially passenger vehicles, is particularly adapted to city circulation, which leads to giving relatively less importance to the suspension, to comfort, to speed and to the possibilities of loading baggage offered by the said vehicles. The road qualities of the latter are affected by, and are often distinctly inferior to those of vehicles of normal bulk.

It is a particular object of the invention to provide such vehicles that respond better than hitherto to the various exigencies of practice and, especially that they do not have, or to a lesser degree, the drawbacks referred to above of the previous state of the art.

According to the invention, a vehicle of short wheel base of the type concerned, is characterized by the fact that it is equipped with a front suspension comprising longitudinal torsion bars downwardly, from the rear towards the front of the vehicle and in that the said torsion bars are housed, at least at their rear upper parts, in said longitudinal members.

Preferably, the vehicle comprises four seats arranged at the apices of a quadrilateral of which the shape is substantially that of a lozenge of which one diagonal is directed along the longitudinal axis of the vehicle, the foremost seat, which serves for the driver, being located between the longitudinal members or the extension of the geometrical axis of the said longitudinal members and being the positioned highest.

In a first embodiment, the longitudinal members extend along the whole length of the chassis and the intermediate seats are located, laterally wholly or partly outside the longitudinal members whilst the rearmost seat is located between the longitudinal members.

In a second embodiment, on one hand, the chassis comprises a rectangular frame, whose transverse dimension is substantially equal to the width of the vehicle and, on the other hand, said longitudinal members, of which the length is only equal to a fraction of the length of the chassis are fixed on the front side of the abovesaid frame and extend forwards.

The invention consists, apart from the features described above, in certain other features which are preferably used at the same time and which will be more explicitly considered below with regard to preferred embodiments according to the invention; which will now be described in more detailed manner and which are given purely by way of illustrative and non-limiting examples, with reference to the accompanying drawings in which:

FIG. 6, shows in perspective, the assembly of a front torsion bar inside a longitudinal member.

Figure 1:
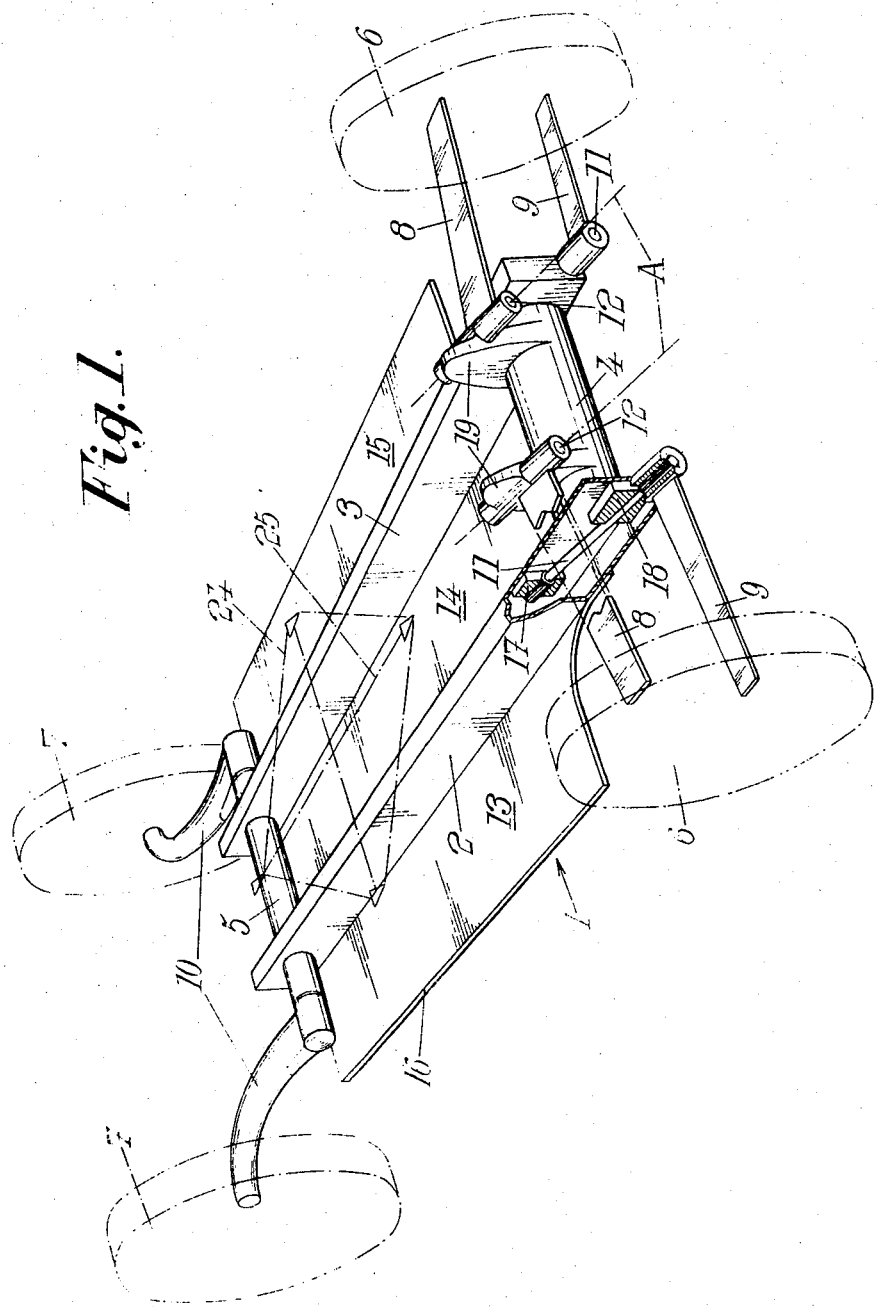
FIG. 1, shows diagrammatically, in perspective with parts removed, the chassis and a portion of the suspension of one embodiment of a vehicle constructed according to the invention.

Referring now to FIG. 1, it is seen that the chassis 1 proper comprises essentially two longitudinal members 2 and 3 and two cross members 4 and 5 arranged respectively at the front and at the rear of the vehicle and connecting the longitudinal members.

The front wheels 6, and possibly the rear wheels 7, of the vehicle are connected to the chassis in independent manner, that is to say so that the movements of one wheel with respect to the chassis have no direct influence on those of the other wheel which occupies the same longitudinal position.

The connection between each front wheel 6 and the chassis 1 can be effected by a pair of connecting members or axle arms: an upper arm 8 and a lower arm 9 substantially parallel and extending laterally in a direction substantially orthogonal to the longitudinal axis of the vehicle.

The connection between each rear wheel 7 and the chassis 1 may be effected by an arm 10 extending longitudinally from the chassis towards the rear, departing progressively from the longitudinal axis of the said chassis.

The front suspension of the vehicle comprises, for each wheel, a longitudinal torsion bar 11. To reduce the "dipping" effect or downward movement of the vehicle, which effect is produced on braking and which is particularly substantial on a vehicle of short wheelbase, the pivoting axis A of the arms 8 and 9, and hence the torsion bar 11, are downwardly inclined, as shown in FIG. 1, the rear portion of the bar being higher than the front portion.

Generally, the upper arm 8 is hinged on a pivot 12 rigidly fixed to chassis 1 and parallel to the torsion bars, whilst the lower arm 9 is rigidly fixed to one end of the corresponding torsion bar 11.

The suspension of the rear wheels 7 may comprise, for each wheel, a transverse torsion bar (not shown) housed and anchored, at one of its ends, in the cross member 5.

Such suspension, especially that of the front wheels, enables a high standard of comfort to be obtained for the passengers of the vehicle and confers on the said vehicle satisfactory road holding qualities.

The inclination of the longitudinal torsion bars 11, which improves the resistance to "dipping" of the vehicle, involves, on the other hand, in conventional solutions, raising the body structure, by an amount substantially equal to that of the difference in level existing between the ends of the bars 11, which is prejudicial to the road holding, to the performance and to the appearance of the vehicle.

The raising is avoided in the case of the present invention, since the torsion bars 11 are housed by their rear upper portion, in the longitudinal members 2 and 3 of the chassis 1. These longitudinal members 2 and 3 have a hollow transverse section, preferably rectangular, having a large dimension oriented perpendicularly to the surface on which the vehicle rolls and are substantially parallel to the longitudinal axis of the vehicle and symmetrical with respect to the said axis. The said longitudinal members 2 and 3 divide the floor 16 of the vehicle into three parts, 13, 14, 15 of substantially equal widths.

The floor 16 of the vehicle is situated at the lower level of the longitudinal members 2 and 3 so that the latter project on the floor of the vehicle.

Longitudinal members 2 and 3 extend forward of the lateral portions 13 and 15 of the said floor, by a length sufficient to enable the passage of the front wheels 6 between the arms 8 and 9 and the portions 13 and 15, on steering.

The rear ends of torsion bars 11 are anchored in blocks 17 rigidly fixed to the upper parts of the longitudinal members 2 and 3.

Just before emerging from the said longitudinal members, the bars 11 pass freely through blocks 18 rigidly fixed to the lower parts of the longitudinal members, the bars 11 pass freely through blocks 18 rigidly fixed to the lower parts of the longitudinal members 2 and 3, which blocks 18 serve as supports for the arms 9 in which the ends of the bars 11 are anchored.

Advantageously, the front cross member 4 may be removable and constituted by a cylindrical tube.

The cross member 4 bears two vertical ears 19, on which are fixed the pivots 12, and serve, in addition, for attaching the majority of the mechanical members of an engine arranged, preferably, at the front.

The middle portion 14 of the floor extends up to the cross member 4, hence well forward of the vehicle.

There is thus obtained a vehicle with a short wheel base, equipped with a suspension of good quality and of which the coach work remains low in spite the inclination of the torsion bars 11, the said vehicle, in spite of its short wheel base and by reason of the inclination of the pivots 12 and the bars 11, resisting well the effect of "dipping".

Figure 2:
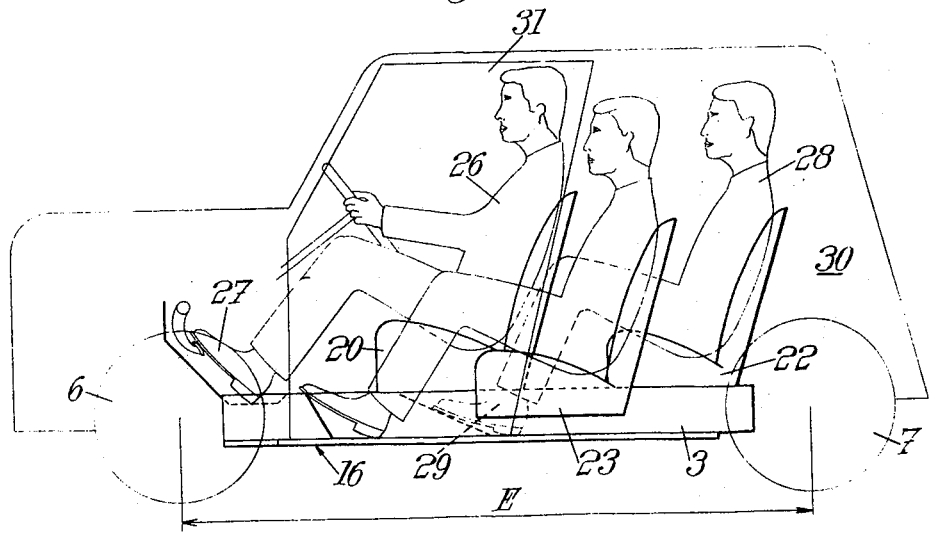
FIG. 2, is diagrammatic view from the side of the embodiment of FIG. 1, in which the seats and the left hand longitudinal members have been drawn in full lines, the remainder being shown in dashed lines.
Figure 3:
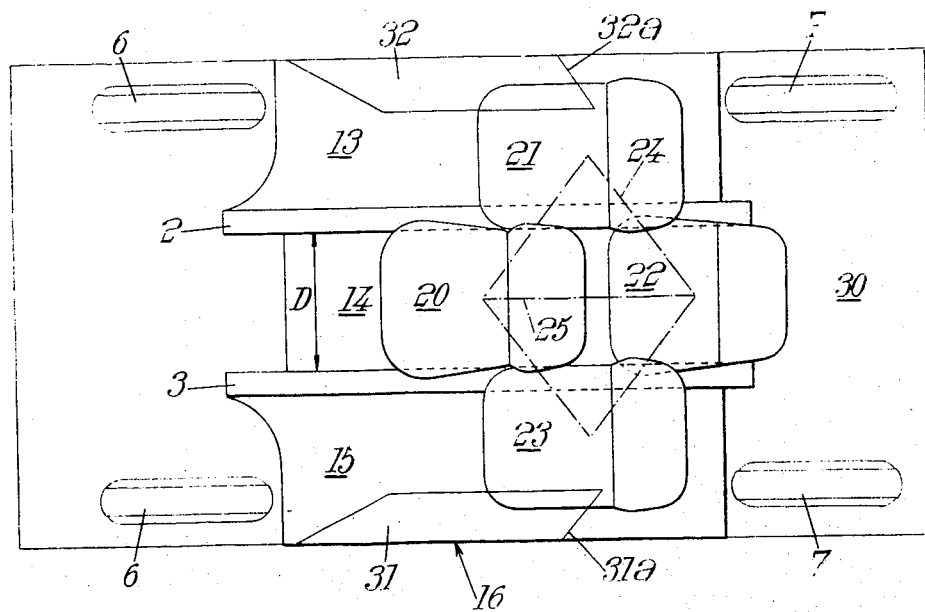
FIG. 3, is a diagrammatic view from above of the embodiment shown in FIG. 2.

Each of the portions 13, 14, 15 may contain at least one seat, preferably two for the middle portion 14, the seats 21, 23 of the outer portion 13 and 15 being staggered longitudinally with respect to the seats 20, 22 of the central portion 14 (see Figures 2 and 3).

The seats 20, 21, 22 and 23 of the vehicle are arranged substantially at the apexes of the lozenge 24 of which one diagonal 25 is directed along the longitudinal axis of the vehicle. The two seats 20, 22 are situated respectively foremost and rearmost of the vehicle, between the longitudinal members 2 and 3. Two other seats 21, 23, intermediate in the longitudinal direction, are situated, in whole or in part, on both sides of the longitudinal members 2 and 3.

The seat 20 is intended for the driver 26 (FIG. 2) of the vehicle and is placed as far forward as possible so that the feet 27 of the driver are between the front wheel of the vehicle and are situated advantageously above the engine/gear box assembly (not shown).

In this way, the rear seat 22 can occupy a longitudinal position much more forward than if it were situated behind the two seats disposed from front to rear. In this latter case, in fact, it would not be possible, for the same width of vehicle, to accomodate normally between the wheels 6, seats for two persons situated at the front, by reason of the lateral clearances provided at the front in the portions 13 and 15 of the floor and necessary for the steering of the wheels. As is clearly seen in FIG. 3, the usable width at the front between the wheels 6 is substantially limited to the distance D separating the two longitudinal members 2 and 3, which distance is substantially equal to the width of the seat.

The advanced position of the seat 20, enabling the rear seat 22 to be given a more advanced position than in known vehicles, contributes to the reduction of the wheel-base E (FIG. 2), hence of the length of the vehicle.

Preferably, the seat 20 is raised with respect to the other two seats, which facilitates the driving of the vehicle by increasing the field of vision of the driver, who is positioned higher and more forward than the passengers of the seats 21 and 23.

This raising of the seat 20, especially with respect to the rear seat 22, enables the rear passenger 28 to advantageously accomodate his legs 29 under the seat 20. Through this fact, the seat 22 can occupy a more forward position than if the seats 20 and 22 were at the same level in height.

This feature contributes therefore also to reduce the wheel-base E of the vehicle.

To improve the comfort of the passenger 28, the lateral seats 21 and 23 are given a position lower with respect to the seat 22 so as to free the field of vision of this passenger.

It will be noted that such an arrangement of the seats enables the avoidance of any passenger having one of the longitudinal members 2 and 3 between his feet, which would not be comfortable.

The view from above (FIG. 3) shows well how the outer contours of the seats, especially the seats 21 and 23, extend over the longitudinal members 2 and 3, which enables the least possible loss of space.

In practice, the seats 21 and 23 touch the seat 20 but there is no impediment as a result for the passengers and driver by reason of the longitudinal staggering which leaves the field free for movements of the arms of the driver and frees his shoulders. In the longitudinal direction, the front edge of the intermediate seats 21, 23 are found to be substantially at the level of the middle of the front seat 20.

It must be noted that, due to the fact of the very advanced position of the rear seat 22, either the wheel-base E can be reduced to a minimum value, or a lesser reduction of the wheel-base can be adopted so as to preserve a considerable useful rear space, which can serve for the stacking of baggage, for example.

Naturally, such a passenger vehicle can be easily transformed into a utility vehicle offering a large stacking capacity. It suffices for this to provide removable seats 21, 22, 23.

The short wheel-base vehicle comprises at least one lateral door and, preferably, a left-hand door 31 and a right-hand door 32, situated, longitudinally, substantially at the position of the front seat 20, which permits easy access to the said front seat and to the two lateral seats 21, 23. In fact, as can be seen from FIG. 3, the doors 31 and 32, when they are open, enable direct access to the seat 20, since the seats 21 and 23 are rearwards of seat 20.

The rear portions 31 *a* and 32 *a* of the contours of the doors occur substantially, in the longitudinal direction, at the mid-point of the seats 23,21.

In this way, the opening of the doors 31, 32, frees the front half of the seats 23, 21, so well that access to these seats is extremely easy.

Access to the rear seat 22 is achieved simply by stepping over one of the lateral seats 21 or 23, which is relatively easy since the said lateral seats occupy the lowest position of the four seats. Access is further facilitated, if as is conventional for vehicles of this class, there is provided for the seat 20 a back which can be folded forward, but this is not indispensable and it is quite possible to have access to the seat 22 when the driver 26 is sitting on the seat 20.

It will be noticed that no transverse strut projects on the portions of the floor 16 where the passengers move to reach their places, which also simplifies this manoeuvre.

The second embodiment of FIGS. 4 and 5 will now be described. The elements of FIGS. 4 and 5, identical or playing similar role to the elements already encountered in FIGS. 1 to 3, will be denoted by a numeral, identical with that already found in FIGS. 1 to 3, followed by the letter *a*.

Figure 4:
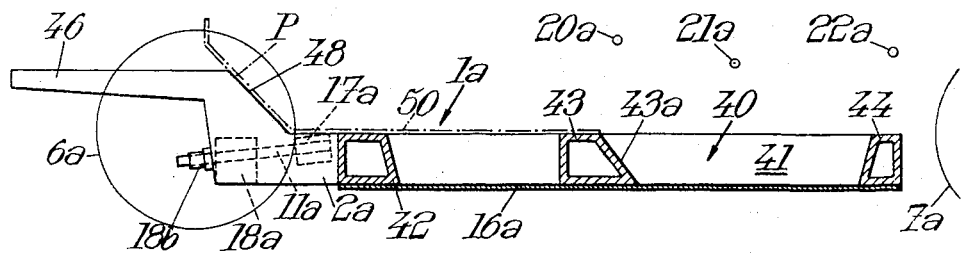
FIG. 4, shows diagrammatically in vertical section, the chassis and a portion of the front suspension of a second embodiment of a vehicle according to the invention.
Figure 5:
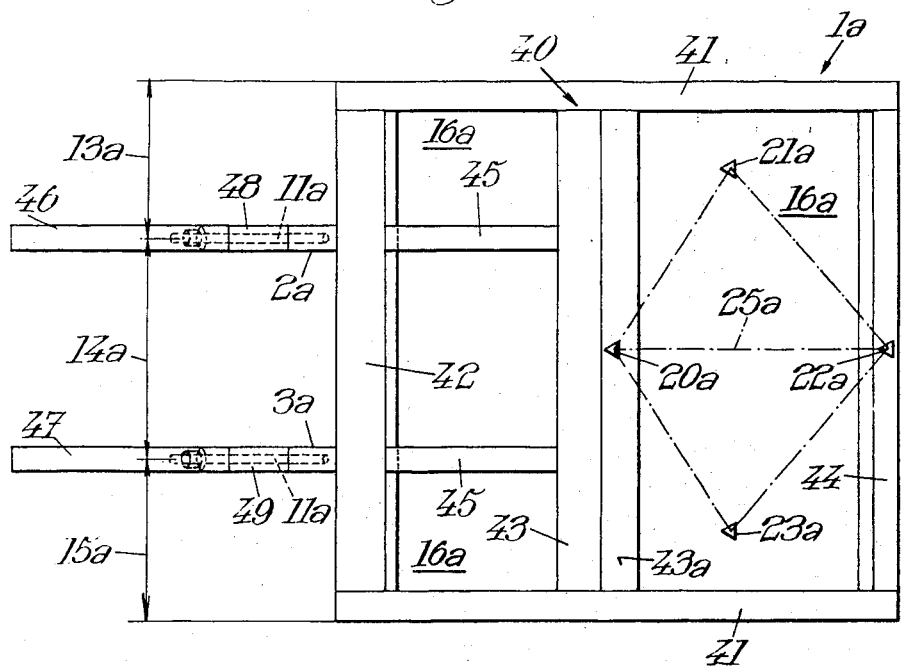
FIG. 5, is a view from above of the chassis of the embodiment of FIG 4; and finally.

The chassis 1a is provided in its front portion, situated on the left of FIGS. 4 and 5, with two longitudinal members 2a, 3a of hollow cross section, substantially parallel to the longitudinal axis of the vehicle and dividing the width of the latter into three parts 13a, 14a, 15a, substantially equal. The section of the longitudinal members 2a, 3a has, preferably, the shape of a rectangle whose large sides are orthogonal to the surface on which the vehicle runs.

The front wheels 6a and rear wheel 7a of the vehicle, are shown in discontinuous line in FIG. 4.

The floor 16a is situated at the lower level of the longitudinal members 2a and 3a over its major portion.

The front suspension of the vehicle comprises longitudinal torsion bars 11a inclined towards the ground which are located, at least at their rear upper portion, in the said longitudinal members 2a, 3a.

The rear ends of the torsion bars 11a are anchored in blocks 17a (FIG. 4) rigidly fixed in the upper rear portion of the longitudinal members 2a, 'i a, whilst the front end of each bar is anchored in a sleeve 8b rigidly fixed to an arm *a* (FIG. 6). The bars 11a pass freely through the blocks 18a rigidly fixed in the front portion of the longitudinal members 2a, 3a, each block 18a bearing, towards the front, a pivot 18b (FIG. 6) for the sleeve 8b.

The chassis 1a of the vehicle comprises a rectangular frame 40, whose width is substantially equal to that of the vehicle, and said longitudinal members 2a, 3a, whose length is only equal to a fraction of the length of the chassis, are fixed on the front transverse side of the aforesaid frame and extend towards the front.

The frame 40 comprises two longitudinal members 41 of the hollow cross section, preferably rectangular, the large sides of the section being vertical.

The frame 40 also comprises three parallel transverse cross-members 42, 43, 44. The cross-members 42, 44 are arranged respectively along front and rear transverse sides of the frame 40. Through this fact the longitudinal member 2 2a, 3a are fixed on the cross-member 42. The intermediate cross member 43 is arranged, in a longitudinal direction, between the cross members 42 and 44. The rear edge of the cross member 43 is located substantially at an equal distance from the cross members 42 and 44. The cross sections of these cross members are hollow and bounded by contours in the shape of a rectangular trapezium which is seen in FIG. 4. The vertical faces of the cross members 42 and 43 are turned towards the front, whilst the vertical surface of the cross member 44 is turned towards the rear. The assembly of the cross members 41 and of the cross members 42, 43, 44 of the frame, just as the fixing of the longitudinal members 2a, 3a, on the cross member 42, may be achieved by welding.

In FIG. 5, it can be seen that two spars 45, with cross section advantageously in a form of a U, connect, in the longitudinal direction, the cross member 42 and 43, the said spars 45 being located in extension of the longitudinal members 2a, 3 3a.

Each longitudinal member 2a, 3a extends forwardly respectively by an elevated portion 46, 47, adapted to support the members of the engine arranged in the front (not shown), so that the whole of one longitudinal member, of the elevated portion, and of the connection between the elevated portion and the longitudinal member proper, has the form of a swan's beck facilitating the mounting and release of the suspension assemblies.

The connection of each portion 46, 47, towards the rear, with the longitudinal member proper 2a, 3a, comprises respectively an inclined surface 48, 49, on which is supported a plate P shown diagrammatically in mixed line in FIG. 4, serving as a foot rest for the driver.

The vehicle comprises four seats 20 *a*, 21a, 22a, 23a arranged at the apexes of a quadrilateral (FIG. 5) which has substantially the shape of a lozenge of which one diagonal 25a is directed along the longitudinal axis of the vehicle.

In FIG. 4, the position of the seats, in elevation, is specified by points, associated with the references denoting the seats, which correspond to the average position of the hips of the occupants. In FIG. 5, in plan view, the position of the seats has been referenced by points associated with reference numerals denoting the positions of the centers of gravity of said seats.

The foremost seat 20a is intended for the driver. This seat is located, in the transverse direction, between the extensions of the geometrical axis of the longitudinal members 2a, , , 3a and, in the longitudinal direction, the point representing the seat is substantially in line with the rear inclined surface 43a of the cross member 43, as is seen in FIG. 5. A raised zone of the floor 50 (FIG. 4) situated at the upper level of the cross members 42, 43, and of the longitudinal members 2a, 3a is advantageously provided under the front portion of the drivers seat. This floor zone has a substantially rectangular shape and extends in the transverse direction between the two stays 45 (FIG. 5) and in the longitudinal direction, between the two cross members 42, 43. The floor zone 50 has not been shown in FIG. 5.

It must be noted that the floor 16a can either extend under the floor zone 50, which case the latter is necessarily connected to the floor 16a, or does not extend under the said floor zone 50, in which case this latter can form an integral part of the floor 16a.

The rearmost seat 22a, is disposed in a transverse direction, like the seat 20a, between the extension of the geometrical axis of the longitudinal members 2a, 3a. In the longitudinal direction, the point representing the seat 22a occurs above the rear cross member 44.

The lateral intermediate seats 21a, 23a are arranged, in the transverse direction, in whole or in part, outside the extensions of the geometrical axis of the longitudinal members 2a, 3a, between these extensions and the longitudinal members 41 of the frame 40. In the longitudinal direction, the points representing the seats 21a, 23a are substantially equidistant from the cross members 43 and 44.

As can be seen in FIG. 4 and 5, the driver has more space available than the other passengers and occupies a position which is, on one hand, relatively low with respect to the floor zone 50 and, on the other hand relatively distant with respect to the place which serves as foot-rest and on which the control pedals project (not shown) such as accelerator, brake, and the clutch pedal. In this way, the driver's legs must be relatively stretched out in order that the driver's feet reach the plate P or the control pedals, which is favorable to driving. The passengers seated on the lateral intermediate seats 21a, and 23a place their feet on both sides of the raised floor zone 50, on the floor 16a between the spars 45 and the longitudinal members 41, in front of the cross member 43. The passenger of the rear seat 22a can place his feet on the inclined rear surface 43a of the cross member 43.

In FIG. 6, there is shown an advantageous construction of the longitudinal member 2a (or 3a, or 2, or 3), which enables the easy introduction of the torsion bar 11a (or 11) in the said longitudinal member. The latter, for the purpose of simplification, has been shown in the upper portion 46, which extends towards the front in FIGS. 4 and 5.

The longitudinal member 2a (or 3a, or 2, or 3) includes, in front and at its lower portion, an opening 51 of rectangular shape. This opening extends, in the transverse direction, between the two vertical surfaces on the longitudinal member and, in the longitudinal direction, over a length 1, to open towards the front of the longitudinal member 2a.

The opening 51 facilitates the introduction into the longitudinal member 2a of the torsion bars 11a previously mounted in its front block support 18a. The latter has a solid cross section whose dimensions are such that the hollow section of the longitudinal member 2a is filled by the solid section of the said block. Holes 52 pass through the block 18a in a direction at right angles to the surfaces of the block intended to face the large vertical surfaces of the longitudinal member 2a. These large surfaces include holes 53 arranged so that, on the positioning of the block 18a in the longitudinal member 2a, the holes 52 and 53 come into coincidence.

The fixing means (not shown) are constituted, for example, by bolts, adapted to pass through the holes 53 and 52 and to project by their threaded end on the large vertical surface of the longitudinal member 2a spaced from the heads of the said bolts, and nuts, adapted to cooperate with the threaded end of the said bolt and to ensure gripping of the vertical surfaces of the longitudinal member 2a against the block 18a. It must be noted that this gripping is facilitated by the presence of the opening 51 which enables deformation and approach towards one another, of the front ends of the vertical surfaces of the longitudinal member 2a.

In this way, there is obtained a vehicle which possesses the following advantages:

by reason of the housing of the rear upper portion of the front longitudinal torsion bars in the longitudinal members, the clearance from the ground of the vehicle is small and its center of gravity is relatively low; as a result, it has good riding qualities, especially good stability and good road holding qualities;

despite its short wheel-base, the vehicle is relatively insensitive to the "dipping" effect, which is produced on braking due to the inclination of the front torsion bars and of the pivoting axis of the front suspension arms;

the vehicle is extremely manoeuvrable by reason of its small wheel-base and of its steering possibilities offered by the clearances provided at the front of the lateral portions 13, 13a and 15, 15a of the floor 16, 16a;

the driving of this vehicle is greatly facilitated by the high and advanced position of the seat 20, 20a of the driver;

access to the various seats of such a vehicle equipped with a door on each side is facilitated by the arrangement of the seats in a lozenge;

finally, the grouping of the seats toward the front of the vehicle enables considerable loading room 30 to be released at the rear.

As is self-evident and as results besides already from the preceding description, the invention is not limited to that of its methods of application nor to those of its methods of production of its various parts, which have been more particularly considered; it embraces, on the contrary, all variations, especially those where the vehicle would be an industrial vehicle such as a tractor.

I claim:

1. Vehicle whose front wheels at least are independently suspended, comprising a chassis provided, at least in its front portion, with two longitudinal members of hollow cross section, substantially parallel to the longitudinal axis of the vehicle and dividing the width of the latter into three substantially equal parts and a floor whose major portion is situated at the lower level of the longitudinal members, a front suspension supporting said chassis and comprising longitudinal torsion bars downwardly inclined from the rear towards the front of the vehicle and housed, at least at their rear upper portion, in said longitudinal members and a suspension arm connected to each respective front wheel and pivoted to said chassis, the axis of said pivot being inclined similarly to said torsion bar.

2. Vehicle according to claim 1, comprising four seats, arranged at the apices of a quadrilateral whose shape is substantially that of a losenge of which one diagonal is directed along the longitudinal axis of the vehicle, the foremost seat, which accomodates the driver, being housed between the longitudinal members and being the highest.

3. Vehicle according to claim 2, wherein the longitudinal members extend along the whole length of the chassis, the intermediate seats are located laterally at least partly outside the longitudinal members and the rearmost seat is housed between the longitudinal members.

4. Vehicle according to claim 3, wherein the engine/gear box assembly and the driver's seat are mutually arranged so that the feet of the driver rest on an intermediate floor provided above said assembly.

5. Vehicle according to claim 1, wherein the chassis comprises a rectangular frame, whose transverse dimension is substantially equal to the width of the vehicle and said longitudinal members are fixed on the front side of said frame and extend forwards.

6. Vehicle according to claim 5, wherein the front portion of each longitudinal member is raised and adapted to support engine parts arranged at the front of the vehicle and an intermediate portion of each longitudinal member comprises an inclined surface on which a plate serving as a foot-rest for the driver of the vehicle is supported.

7. Vehicle according to claim 5, wherein the rectangular frame comprises two longitudinal struts and three transverse struts connecting the longitudinal struts, said longitudinal members being fixed on the front transverse strut, which is connected, by two longitudinal spars of U-section arranged in extension of the longitudinal members, to the intermediate transverse strut.

8. Vehicle according to claim 2, including a raised zone built up on the floor or forming an integral part of the latter, of rectangular shape, extending under the front portion of the driver's seat, longitudinally between the front cross member and the intermediate cross member and, laterally, between the two spars connecting the two cross members, and wherein the rest of the floor extends at the lower level of the frame and is bounded by the shape of the latter.

9. Vehicle whose front wheels at least are independently suspended, comprising a chassis provided, at least in its front portion, with two longitudinal members of hollow cross section, substantially parallel to the longitudinal axis of the vehicle and dividing the width of the latter into three substantially equal parts and a floor, whose major portion is situated at the lower level of the longitudinal members, a front suspension supporting said chassis and comprising longitudinal torsion bars downwardly inclined from the rear towards the front of the vehicle and housed, at least at their rear upper portion, in said longitudinal members and a suspension arm connected to each respective front wheel and pivoted to said chassis, the axis of said pivot being inclined similarly to said torsion bar, wherein said longitudinal members include, at the front, a lower portion open over a sufficient length to enable easy introduction into the longitudinal member of a torsion bar mounted in a front support block, said block being held in the longitudinal member by fixing means adapted to clamp the vertical faces of the longitudinal member against said block.

10. Vehicle according to claim 2, wherein the rearmost seat, although less elevated than the driver's seat, is higher than the two intermediate seats.

11. Vehicle according to claim 1, comprising on each side, a door located longitudinally, substantially at the level of the front seat, the rear contour of said door reaching, in the longitudinal direction, substantially the level of half of the intermediate lateral seats.

12. Vehicle according to claim 1, wherein the longitudinal members have a rectangular cross section with the largest side of the rectangle vertical.

13. Vehicle according to claim 1, wherein the pivot of said suspension arm is coaxial with said torsion bar.

14. Vehicle according to claim 1, including a second suspension arm connected to each respective front wheel and pivoted to said chassis.

* * * * *